(12) United States Patent
Roundtree et al.

(10) Patent No.: US 9,100,936 B2
(45) Date of Patent: Aug. 4, 2015

(54) SYSTEM AND METHOD FOR DETECTING MUTUALLY SUPPORTED CAPABILITIES BETWEEN MOBILE DEVICES

(75) Inventors: Brian Roundtree, Kirkland, WA (US); Jake A. Russell, Bellevue, WA (US)

(73) Assignee: Nuance Communications, Inc., Burlington, MA (US)

( * ) Notice: Subject to any disclaimer, the term of this patent is extended or adjusted under 35 U.S.C. 154(b) by 1183 days.

(21) Appl. No.: 12/595,803

(22) PCT Filed: Apr. 11, 2008

(86) PCT No.: PCT/US2008/060137
§ 371 (c)(1),
(2), (4) Date: Feb. 18, 2010

(87) PCT Pub. No.: WO2008/128119
PCT Pub. Date: Oct. 23, 2008

(65) Prior Publication Data
US 2010/0144325 A1  Jun. 10, 2010

Related U.S. Application Data

(60) Provisional application No. 60/911,398, filed on Apr. 12, 2007.

(51) Int. Cl.
*H04B 7/00* (2006.01)
*H04W 76/02* (2009.01)
*H04W 4/00* (2009.01)
*H04W 4/20* (2009.01)
*H04W 8/26* (2009.01)

(52) U.S. Cl.
CPC ............... *H04W 76/02* (2013.01); *H04W 4/00* (2013.01); *H04W 4/20* (2013.01); *H04W 8/26* (2013.01)

(58) Field of Classification Search
USPC ................. 455/466, 415, 517–519, 432.3; 370/353; 379/201.01
See application file for complete search history.

(56) References Cited

U.S. PATENT DOCUMENTS

| | | | |
|---|---|---|---|
| 4,730,252 | A | 3/1988 | Bradshaw |
| 5,422,656 | A | 6/1995 | Allard et al. |
| 5,475,735 | A | 12/1995 | Williams et al. |

(Continued)

FOREIGN PATENT DOCUMENTS

| | | |
|---|---|---|
| CA | 2454334 A1 | 2/2003 |
| CN | 1283341 A | 2/2001 |

(Continued)

OTHER PUBLICATIONS

U.S. Appl. No. 13/269,970, filed Oct. 10, 2011, Roundtree et al.

(Continued)

*Primary Examiner* — Christopher M Brandt
*Assistant Examiner* — Joseph Dean, Jr.
(74) *Attorney, Agent, or Firm* — Perkins Coie LLP (57) ABSTRACT

A system and method for detecting mutually supported capabilities between two or more mobile devices is described. In some cases, the system transmits a message to a called device requesting information about the device. In some cases, the transmitted message is answered by a user of the device. In some cases, the transmitted message is automatically received and answered by the called device. In some cases, the system presents information about a service supported by a called party during a call placed to the party.

19 Claims, 4 Drawing Sheets

(56) References Cited

U.S. PATENT DOCUMENTS

| | | | |
|---|---|---|---|
| 5,675,628 A | 10/1997 | Hokkanen | |
| 5,790,798 A | 8/1998 | Beckett, II et al. | |
| 5,831,598 A | 11/1998 | Kauffert et al. | |
| 5,845,211 A | 12/1998 | Roach, Jr. | |
| 6,031,467 A | 2/2000 | Hymel et al. | |
| 6,151,507 A | 11/2000 | Laiho et al. | |
| 6,199,045 B1 | 3/2001 | Giniger et al. | |
| 6,219,047 B1 | 4/2001 | Bell | |
| 6,245,756 B1 | 6/2001 | Patchev et al. | |
| 6,246,756 B1 | 6/2001 | Borland et al. | |
| 6,301,480 B1 | 10/2001 | Kennedy, III et al. | |
| 6,368,205 B1 | 4/2002 | Frank | |
| 6,370,399 B1 | 4/2002 | Phillips | |
| 6,389,278 B1 | 5/2002 | Singh | |
| 6,424,945 B1 | 7/2002 | Sorsa et al. | |
| 6,430,252 B2 | 8/2002 | Reinwand et al. | |
| 6,430,407 B1 | 8/2002 | Turtiainen et al. | |
| 6,496,979 B1 | 12/2002 | Chen et al. | |
| 6,615,038 B1 | 9/2003 | Moles et al. | |
| 6,618,478 B1 | 9/2003 | Stuckman et al. | |
| 6,646,570 B1 | 11/2003 | Yamada et al. | |
| 6,654,594 B1 | 11/2003 | Hughes et al. | |
| 6,668,169 B2 | 12/2003 | Burgan et al. | |
| 6,720,864 B1 | 4/2004 | Wong et al. | |
| 6,748,211 B1 | 6/2004 | Isaac et al. | |
| 6,766,017 B1 | 7/2004 | Yang et al. | |
| 6,792,280 B1 | 9/2004 | Hori et al. | |
| 6,909,910 B2 | 6/2005 | Pappalardo et al. | |
| 6,922,721 B1 | 7/2005 | Minborg et al. | |
| 6,931,258 B1 | 8/2005 | Jamstrom et al. | |
| 6,940,844 B2 | 9/2005 | Purkayastha et al. | |
| 6,944,447 B2 | 9/2005 | Portman et al. | |
| 6,970,698 B2 | 11/2005 | Majmundar et al. | |
| 6,978,147 B2 | 12/2005 | Coombes | |
| 7,024,199 B1 | 4/2006 | Massie et al. | |
| 7,099,288 B1 * | 8/2006 | Parker et al. | 370/259 |
| 7,177,665 B2 | 2/2007 | Ishigaki | |
| 7,194,257 B2 | 3/2007 | House et al. | |
| 7,209,964 B2 | 4/2007 | Dugan et al. | |
| 7,236,166 B2 | 6/2007 | Zinniel et al. | |
| 7,308,497 B2 | 12/2007 | Louviere et al. | |
| 7,353,016 B2 | 4/2008 | Roundtree et al. | |
| 7,359,706 B2 | 4/2008 | Zhao | |
| 7,376,414 B2 | 5/2008 | Engstrom | |
| 7,379,969 B2 | 5/2008 | Osborn, Jr. | |
| 7,539,484 B2 | 5/2009 | Roundtree | |
| 7,558,965 B2 | 7/2009 | Wheeler et al. | |
| 7,783,729 B1 * | 8/2010 | Macaluso | 709/220 |
| 7,899,915 B2 | 3/2011 | Reisman | |
| 2001/0014615 A1 | 8/2001 | Dahm et al. | |
| 2001/0046886 A1 | 11/2001 | Ishigaki | |
| 2002/0034940 A1 | 3/2002 | Takae et al. | |
| 2002/0065109 A1 | 5/2002 | Mansikkaniemi et al. | |
| 2002/0112172 A1 | 8/2002 | Simmons | |
| 2002/0115476 A1 | 8/2002 | Padawer et al. | |
| 2002/0123368 A1 | 9/2002 | Yamadera et al. | |
| 2002/0123940 A1 | 9/2002 | Spets | |
| 2002/0128036 A1 | 9/2002 | Yach et al. | |
| 2002/0152229 A1 | 10/2002 | Peng | |
| 2002/0155476 A1 | 10/2002 | Pourmand et al. | |
| 2003/0013483 A1 | 1/2003 | Ausems et al. | |
| 2003/0039948 A1 | 2/2003 | Donahue | |
| 2003/0053615 A1 | 3/2003 | Anderson et al. | |
| 2003/0112931 A1 | 6/2003 | Brown et al. | |
| 2003/0187650 A1 | 10/2003 | Moore et al. | |
| 2003/0204725 A1 | 10/2003 | Itoi et al. | |
| 2003/0233461 A1 | 12/2003 | Mariblanca-Nieves et al. | |
| 2004/0132431 A1 | 7/2004 | Vandermeijden et al. | |
| 2004/0142720 A1 | 7/2004 | Smethers | |
| 2004/0171375 A1 | 9/2004 | Chow-Toun | |
| 2004/0172561 A1 | 9/2004 | Iga | |
| 2004/0193444 A1 | 9/2004 | Hufford et al. | |
| 2004/0198316 A1 | 10/2004 | Johnson | |
| 2004/0224710 A1 * | 11/2004 | Koskelainen et al. | 455/518 |
| 2005/0010573 A1 * | 1/2005 | Garg | 707/10 |
| 2005/0020252 A1 * | 1/2005 | Yang et al. | 455/415 |
| 2006/0003758 A1 | 1/2006 | Bishop et al. | |
| 2006/0047830 A1 | 3/2006 | Nair et al. | |
| 2006/0128375 A1 | 6/2006 | Wessel van Rooyen | |
| 2006/0158436 A1 | 7/2006 | LaPointe et al. | |
| 2006/0168303 A1 | 7/2006 | Oyama et al. | |
| 2006/0229054 A1 | 10/2006 | Erola et al. | |
| 2006/0240808 A1 | 10/2006 | Crolley | |
| 2006/0245391 A1 | 11/2006 | Vaidya et al. | |
| 2006/0274869 A1 | 12/2006 | Morse | |
| 2007/0019563 A1 | 1/2007 | Ramachandran et al. | |
| 2007/0037573 A1 * | 2/2007 | Kyung et al. | 455/435.2 |
| 2007/0061243 A1 | 3/2007 | Ramer et al. | |
| 2007/0064743 A1 | 3/2007 | Bettis et al. | |
| 2007/0135140 A1 | 6/2007 | Tervo | |
| 2007/0173237 A1 | 7/2007 | Roundtree | |
| 2007/0189275 A1 * | 8/2007 | Neff | 370/352 |
| 2007/0207795 A1 | 9/2007 | Roundtree | |
| 2007/0293199 A1 | 12/2007 | Roundtree et al. | |
| 2007/0293200 A1 | 12/2007 | Roundtree et al. | |
| 2008/0189550 A1 | 8/2008 | Roundtree | |
| 2008/0194296 A1 | 8/2008 | Roundtree | |
| 2008/0256447 A1 | 10/2008 | Roundtree et al. | |
| 2008/0280588 A1 | 11/2008 | Roundtree et al. | |
| 2009/0102639 A1 | 4/2009 | Bozionek et al. | |
| 2009/0124271 A1 | 5/2009 | Roundtree et al. | |
| 2009/0254912 A1 | 10/2009 | Roundtree et al. | |
| 2011/0117894 A1 | 5/2011 | Roundtree et al. | |

FOREIGN PATENT DOCUMENTS

| | | |
|---|---|---|
| CN | 2478292 | 2/2002 |
| CN | 1361995 A | 7/2002 |
| CN | 1611087 | 4/2005 |
| EP | 1387241 A2 | 2/2004 |
| GB | 2340344 A | 2/2000 |
| GB | 2365711 A | 2/2002 |
| JP | 62072058 A | 4/1987 |
| JP | 07-203536 A | 8/1995 |
| JP | 09-507986 T | 8/1997 |
| JP | 10084404 A | 3/1998 |
| JP | 11-195062 A | 7/1999 |
| JP | 11259199 A | 9/1999 |
| JP | 2000348022 A | 12/2000 |
| JP | 2002-135848 A | 5/2002 |
| JP | 200305880 | 1/2003 |
| JP | 2003067334 | 3/2003 |
| JP | 2003108182 A | 4/2003 |
| JP | 2003-188982 A | 7/2003 |
| JP | 2003186590 A | 7/2003 |
| JP | 2003-280803 A | 10/2003 |
| JP | 2003-303172 A | 10/2003 |
| JP | 2003-308148 A | 10/2003 |
| JP | 2003-309880 A | 10/2003 |
| JP | 2004021580 | 1/2004 |
| JP | 2004-048790 A | 2/2004 |
| JP | 2005110063 A | 4/2005 |
| JP | EU-1538855 A2 | 6/2005 |
| KR | 200344337 | 6/2003 |
| WO | WO-9707641 | 2/1997 |
| WO | WO-0070888 | 11/2000 |
| WO | WO-0186472 | 11/2001 |
| WO | WO-2005081852 A2 | 9/2005 |
| WO | WO-2005083996 A1 | 9/2005 |
| WO | WO-2007002499 A2 | 1/2007 |
| WO | WO-2007044972 A2 | 4/2007 |
| WO | WO-2007070837 A2 | 6/2007 |
| WO | WO-2007092908 A2 | 8/2007 |
| WO | WO-2008042989 A2 | 4/2008 |
| WO | WO-2008086320 A1 | 7/2008 |
| WO | WO-2008128119 A1 | 10/2008 |

OTHER PUBLICATIONS

Supplementary European Search Report for European Patent Application No. 06840247.8, Mail Date Feb. 2, 2012, 8 pages.

U.S. Appl. No. 11/917,323, filed Dec. 12, 2007, Roundtree.

U.S. Appl. No. 12/521,989, filed Jul. 1, 2009, Roundtree.

(56) References Cited

OTHER PUBLICATIONS

3rd Generation Partnership Project. "Specification of the SIM Application Toolkit for the Subscriber Identity Module—Mobile Equipment (SIM-ME) Interface (Release 1999)," 3GPP Organizational Partners, 2004, 143 pages.

Center for Customer Driven Quality at Purdue University, "It's the Solution, Stupid," 2004 2 pages.

Gartner, Contact Center Investment Strategy and Leading Edge Technologies, http://www.gartner.com/4_decision_tools/measurements/measure_it_articles/2002_12/contact_center_investment_strategy.jsp, accessed on Jul. 8, 2008, 4 pages.

International Search Report for International Application No. PCT/US08/60137, dated Jun. 30, 2008, Applicant SNAPinSoftware Inc.

U.S. Appl. No. 12/444,332, filed Dec. 28, 2009, Roundtree.

U.S. Appl. No. 12/446,221, filed Jan. 6, 2010, Roundtree.

U.S. Appl. No. 12/522,901, filed Jul. 10, 2009, Roundtree.

U.S. Appl. No. 12/720,624, filed Mar. 9, 2010, Roundtree et al.

SNAPin Software Inc., "SNAPin White Paper: The Service Experience Opportunity," <http://www.snapin.com>, 2005, 16 pages.

Non-Final Office Action for U.S. Appl. No. 14/095,931, mailed Feb. 25, 2015, 10 pages.

\* cited by examiner

SYSTEM AND METHOD FOR DETECTING MUTUALLY SUPPORTED CAPABILITIES BETWEEN MOBILE DEVICES

CROSS REFERENCE TO RELATED APPLICATIONS

This application is a U.S. National Phase application of International Application Serial No. PCT/US08/60137, filed on Apr. 11, 2008, which claims priority to U.S. Provisional Patent Application No. 60/911,398, filed on Apr. 12, 2007, entitled METHOD FOR DETECTING ENHANCED SERVICES IN MOBILE DEVICES, each of which is hereby incorporated by reference in its entirety.

BACKGROUND

Currently, mobile devices are capable of providing numerous services to a user. In addition to voice calls, mobile devices provide text messaging, instant messaging, cameras, music players, video services, voice over IP (such as via Skype), online or multiplayer games (such as World of Warcraft), bill pay, and so on.

However, for a variety of reasons, users of mobile devices are not taking advantage of the capabilities provided to them by their mobile devices. In some cases, one mobile device may have certain services, while other mobile devices may have other services. In some cases, a user of a mobile device may be unaware of services of his/her device, or of services on other users' devices, such as devices called by the user. These and other problems exist with respect to providing services to mobile device users.

DETAILED DESCRIPTION

A system and method for detecting the capabilities of mobile devices is disclosed. The system, via a user's mobile device, may detect, determine, and/or identify some or all enhanced services provided by another mobile device called by the user. In some examples, the system sends a short message from the user's mobile device to the called mobile device in order to determine services and/or capabilities provided by the called device. In some examples, the system appends a machine-readable code or identifier to the number used to call the device. The message and/or information may prompt the called device to return a message or information to the user device that identifies or otherwise indicates the capabilities of the called device. In some cases, the returned data may identify some or all capabilities of the called device. Alternatively or additionally, the returned data may identify a supported service or capability specifically requested by the user device.

In some cases, the system presents information about services supported by the called party when a call is being made. The information may ask the user to select a service, or may provide information about services supported by the called device. For example, while a call is placed to a called party, the system may determine that the called party supports a service and query the user to proceed with the call using the service. Upon receiving a positive indication from the user, the system connects or updates the call with the service.

The technology will now be described with respect to various examples. The following description provides specific details for a thorough understanding of, and enabling description for, these examples of the technology. However, one skilled in the art will understand that the technology may be practiced without these details. In other instances, well-known structures and functions have not been shown or described in detail to avoid unnecessarily obscuring the description of the examples of the technology.

It is intended that the terminology used in the description presented below be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Suitable System

Figure 1:
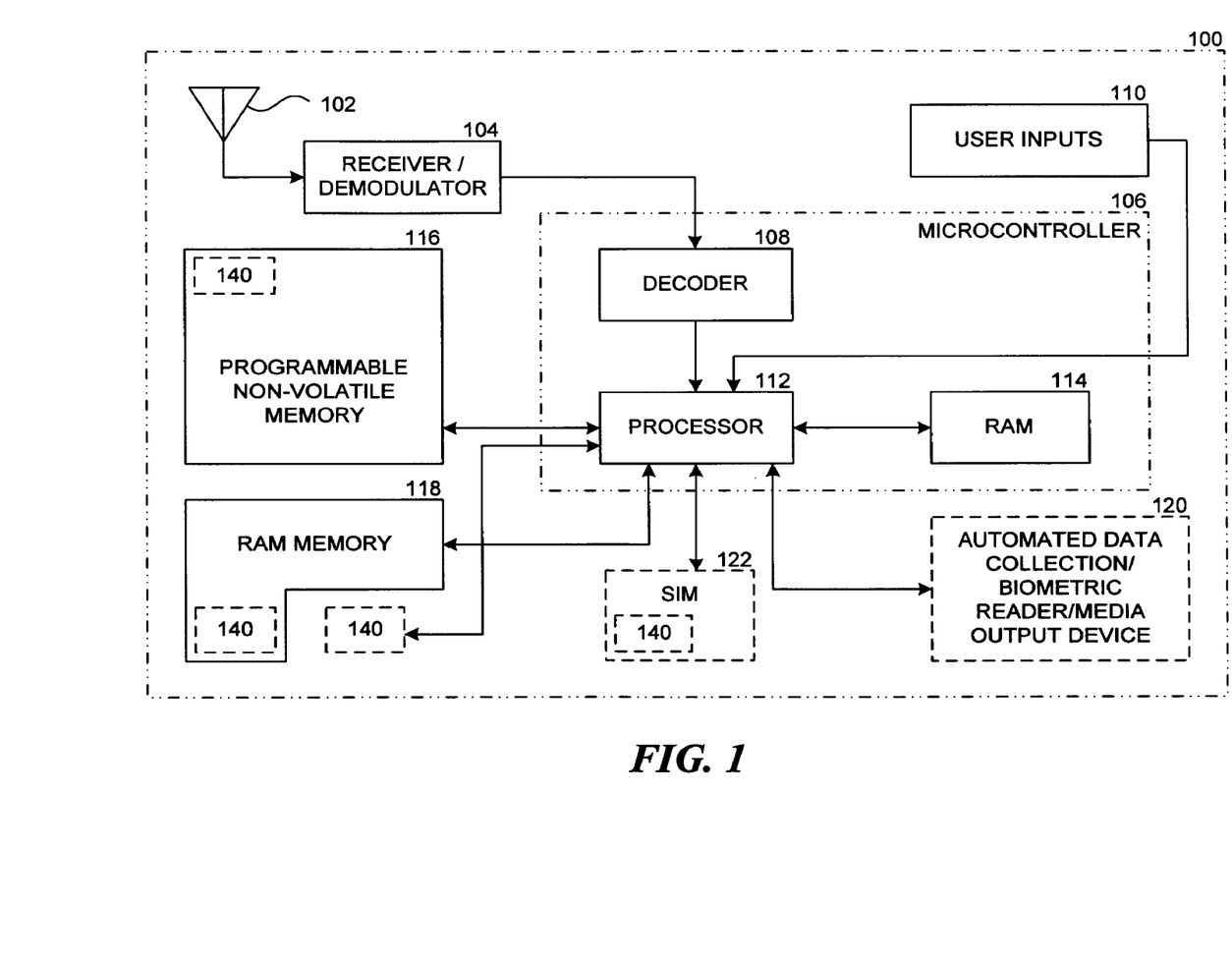
FIG. 1 is a schematic diagram illustrating a mobile device on which systems of detecting enhanced services may be implemented.

FIG. 1 illustrates a mobile device 100 on which can be implemented in accordance with several examples of the technology. A receiver/demodulator 104 receives a transmitted signal via an antenna 102 and reconstructs the original transmitted signal. The transmitted signal is sent to a microcontroller 106, which consists of a decoder 108, a processor 112, and RAM (Random Access Memory) 114. The decoder 108 translates the signals into meaningful data and interfaces to other devices. Decoded data, along with subscriber inputs 110, are sent to the processor 112. In addition, the mobile device may include optional components, such as an automated data collection 120 unit linked to the processor 112, which can include an automated RFID (Radio Frequency Identification) tag reader, a magnetic card swipe reader, a bar code reader, and others. Additionally, or alternatively, the mobile device may include a biometric reader (e.g., thumbprint reader, voice fingerprint recognition functionality, etc.), and/or a media output device (e.g., MP3 player, television tuner/player, camera, speaker, headphones, etc.) 120. The mobile device may also include a subscriber identity module (SIM) 122. The output of the processor 112 can be stored in a programmable non-volatile memory 116 or in the RAM memory 118.

Memory 116, 118, or memory of the SIM card 122 may contain a detection component 140 that provides data, scripts, applications and other information required to detect the services and/or capabilities of mobile devices that interact with the mobile device 100. Additionally, the device may contain a detection component 140 (described herein) as a separate component outside of the device memory components 116, 118 or the SIM device 122.

FIG. 1 and the discussion herein provide a brief, general description of a suitable telecommunications or computing environment in which the technology can be implemented. Although not required, aspects of the technology are described in the general context of computer-executable instructions, such as routines executed by a general-purpose computer, e.g., mobile device, a server computer, or personal computer. Those skilled in the relevant art will appreciate that the technology can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor. Indeed, aspects of the invention apply not only to mobile devices, but also to stationary ones with network connections, such as an appliance (refrigerator) having a wireless LAN connection (WiFi).

Aspects of the technology can be embodied in a special purpose computing device or data processor that is specifically programmed, configured, or constructed to perform one or more of the computer-executable instructions explained in detail herein. Aspects of the technology may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the technology reside on a server computer, while corresponding portions reside on a client computer such as a mobile or portable device, and thus, while certain hardware platforms are described herein, aspects of the technology are equally applicable to nodes on a network. In an alternative embodiment, the mobile device or portable device may represent the server portion, while the server may represent the client portion.

While the examples herein employ software stored on the mobile device, the scripts and other software described herein may be hard coded into the mobile device (e.g. stored in EEPROM, PROM, etc.). Further, the above functionality may be implemented without scripts or other special modules.

Detection of Capabilities of Mobile Devices

Figure 2A:
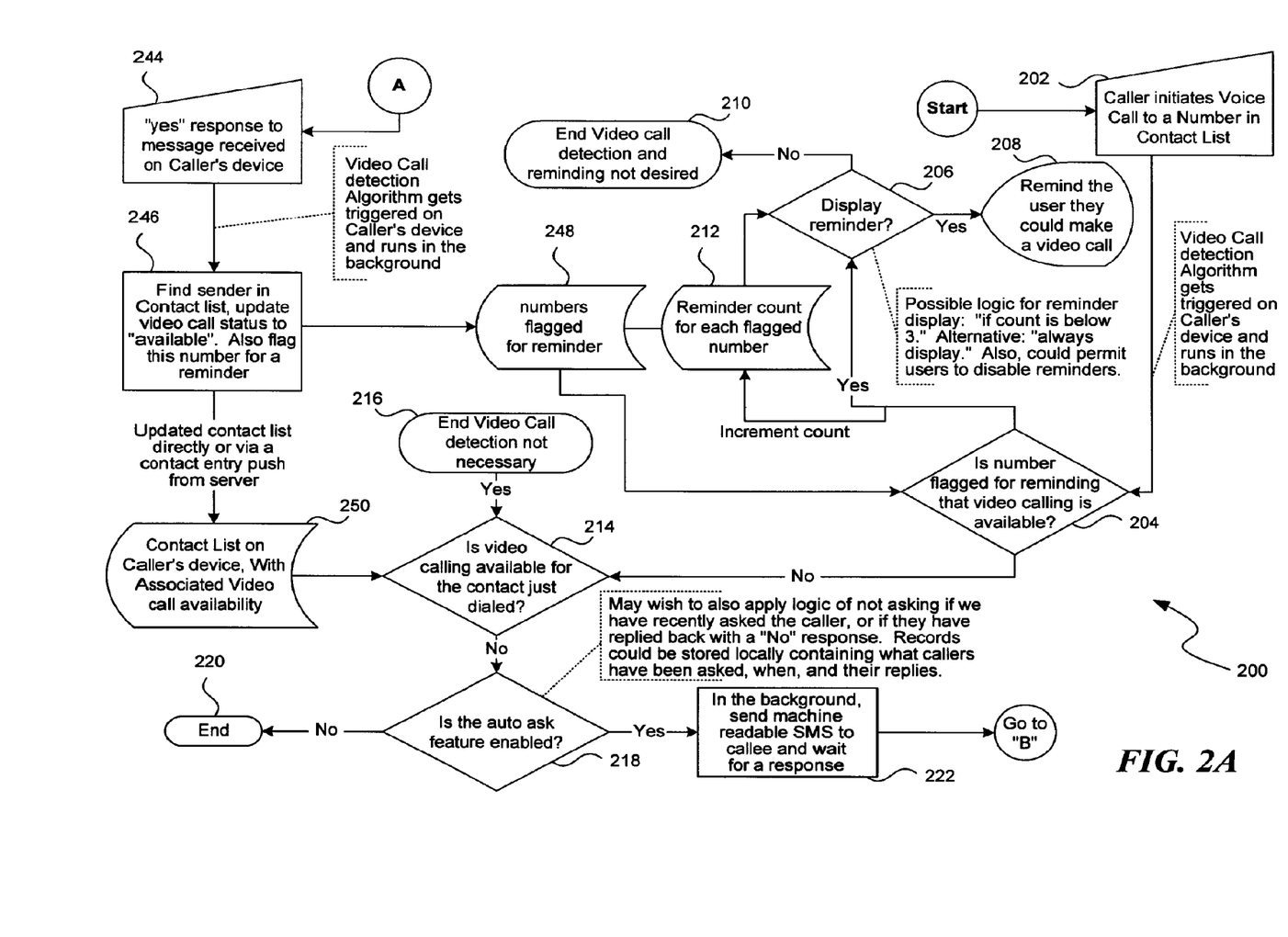
FIGS. 2A-2B are flow diagrams illustrating a method of detecting enhanced services on a mobile device.
Figure 2B:
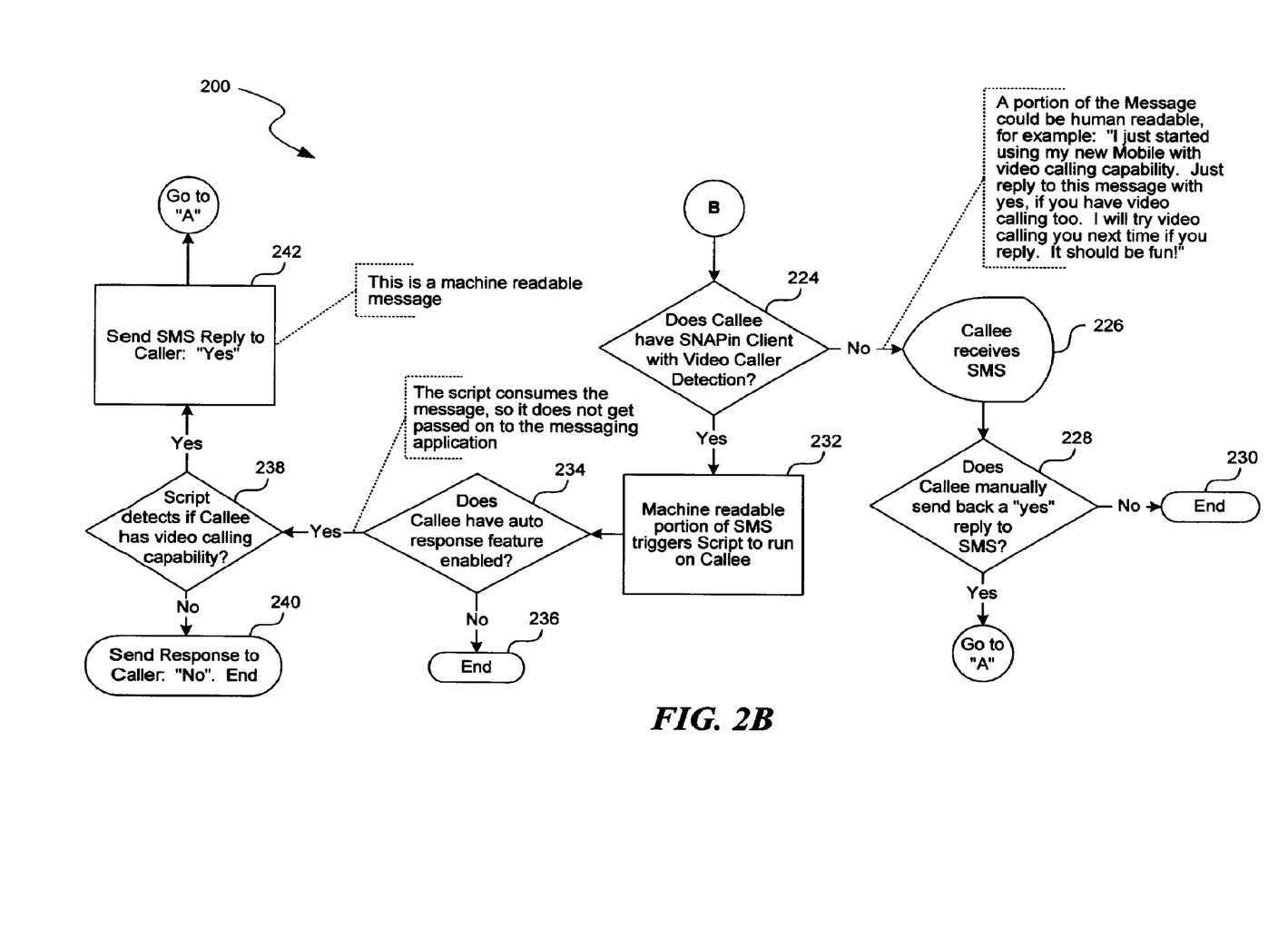

As described herein, in some cases a detection component 140 is configured to determine if a mobile device, in communication with device 100, supports certain enhancements. Referring to FIGS. 2A-2B, a flow diagram illustrating a routine 200 for detecting enhanced services on a mobile device is shown. The system may perform some or all steps of routine 200 when determining enhanced services supported by a mobile device.

Beginning at block 202, a user of a mobile device 100 initiates a voice or other call to another device. For example, the user may input a number of the called party, may select a contact from a list of contacts stored on the device 100, may reply to a received call, may press a speed dial key associated with the voice call, may speak the number or information associated with the called party, and so on.

In addition, the user may initiate other communications to the other device. For example, the user may send an SMS message to the device, a USSD communication, an email message, an instant message, and so on. The messages may be sent to the phone number of the device, or may be sent to other addressed associated with the device (e.g., an email address, an instant messaging address, and so on).

In addition to or instead of a call or communications being initiated in 202, the call or communications may have been terminated, may have been placed or terminated for a certain predetermined number of times at the given other device (such as a call placed to a phone number for the third time), the number or communication address may be placed into a speed dial list, the number or communication address may be placed into an address book or a contact list, a combination of above triggers may have occurred, and so on.

In decision block 204, the routine 200 checks to see if the system is aware of any previously determined information or indicators that the called number is capable of enhanced services, which in the depicted example is video calling or conferencing. For example, the check may include searching the "numbers flagged for reminder" list 248 for information associated with the called number. If the system does retrieve information, such as information related to a called number being flagged, routine 200 proceeds to block 206 (and, optionally to block 212), else to block 214. Such a check, and a database storing such data, can be done locally on the phone. Alternatively or additionally, thus a check can be done by the wireless network (e.g. by a server with database in communication with the network). As such, the database and server can include user account records that indicate services available for particular users (e.g. whether a user has paid for certain services). The server may also recognize the type or model of phone and thus recognize whether the phone is configured for certain services.

At decision block 206, routine 200 requests information to display a reminder to the user that the called device supports enhanced services (e.g., video calling). For example, routine 200 may also proceed to block 212 and increment a counter before requesting information whether to display the reminder to the user. In another example, the routine 200 in block 212 may perform a test to determine if a 3G network is currently available for making a video call. Then, routine 200 may check the count and display reminders when the count is below a threshold number (e.g., only display the reminder the first three times the number is called). In some cases, routine 200 may always display the reminder, may allow the user to disable reminders or to request additional reminders at a later time, and so on). When decision block 206 receives an indication to display a reminder to a user (such as checking the count and determining the count is below the threshold), routine 200 proceeds to block 208 and the device reminds the user that the called number (or, called device associated with the number) is capable of enhanced services, in this example video calling. When decision block 206 receives an indication to not show the reminder, routine 200 ends and the device proceeds with the call as a normal call.

An example reminder screen may display: "Did you know you can place a video call to this number? Try it now?" If the user selects "Yes", the system may automatically initiate a video call. If the user selects "Not Now", the reminder is dismissed and may be presented the next time the number is called or messaged.

Referring back to decision block 204, when the called number is not flagged or the system has not already determined capabilities related to the called number, routine 200 proceeds to decision block 214 and requests information related to the called number. If the system has knowledge that the number is configured for video calling, routine 200 proceeds to block 216 and routine 200 ends. If the system does not have knowledge or information related to the capabilities supported by the called number, routine 200 proceeds to decision block 218 and checks to see whether detection features are enabled on the device 100, such as an auto ask feature that automatically transmits messages to called devices when prompted. In addition to checking if the detection component 140 is configured to request information from called numbers, the routine 200 at decision block 218 may also prompt the device 100 to determine whether the called number has provided a response at an earlier time. For example, the phone or cellular network component may contain a database of called numbers that do not support video calling and routine 200 may look to the database before requesting information from a called number. For example, the number may be in the list of "numbers flagged for reminder" 248.

When a positive indication is received at decision block 218, routine 200 proceeds to block 222, else to block 220 and ends. At block 222, the system transmits a short message (SMS) or other signal to the called number. For example, the SMS may contain some or all machine readable information used to prompt the device associated with the called number to return an answer to any requested information. For example, the system may append a unique identifier or other machine-readable identifier to the end of an address where the SMS is sent, or into the extended dialing digits of the called number. Additionally, the SMS may contain machine-readable information in the message body, in a subject field, in a return address field, and so on.

The SMS message may be binary SMS, or some form of text-based SMS, among others. For example, the communication from one device to the other may use one or more binary SMS messages, instead of or in addition to one or more text SMS messages. In other cases, data or messages may be transmitted over a voice channel in a machine-recognizable manner (e.g., one or more DTMF tones).

In some cases, information associated with enhanced services on devices may be maintained or stored on one or more network servers, such as within a directory associating the device phone number with the enhanced service(s) supported or not supported on that device. The directory may be a phone directory used to maintain not only addresses, names, and phone numbers, but other information associated with enhanced services. In these cases, the device may transmit the SMS message to the server instead of or in addition to the called device. For public servers, the SMS message may include a password to be received by the server.

In some cases, devices without SIM cards may also transmit messages with unique identifiers, such as an ESN on a CDMA device). In these cases, the identifier enables the device to be recognized by the wireless network without requiring a SIM card by associating the device with a phone number and allowing (or denying) access to a wireless service based on this information.

The system may remind a user of enhanced services the first time a number is called, and not remind the user again. For example, when the same number is called after receiving a reminder at an earlier time, the number is placed in list 248 to avoid transmitting additional reminders. Also, the system may set the reminder count 212 to a high value to prevent reminders when subsequent calls are made to the same number.

In some cases, the called device may contain the client, application, and or scripts similar to those found in detection component 140, such as a script that invokes and performs some or all steps of routine 200. Thus, after the SMS is sent by device 100, the system, at decision block 224, determines if the called device contains a similar script or client that is capable of reading and replying to SMS messages containing machine readable information (the "SNAPin Client" depicted in FIG. 2B).

Clients on mobile devices may enable mobile operators to deploy their detection capabilities to many of their users, working on various different devices, because the client uses portable, customizable scripts. For example, they may brand the user experience (such as displays associated with steps 206, 208, or 218). Additionally, upon detection or non-detection, the clients may facilitate the transfer or update of services between devices or between network components and associated devices.

If the called device contains a script or client, routine 200 proceeds to block 232, else to block 226. At block 226, the user receives the SMS requesting information related to video calling. Should the user reply to the message, at decision block 228, with a positive indication (such as a message containing the word "yes" or simply by replying with a blank message body), routine 200 proceeds to block 244. Should the user reply with a negative indication, routine 200 proceeds to block 230 and ends. In some cases, routine 200 may cause the system to then query the user about the services not supported by his/her device. When possible, the system may facilitate providing services to users once it becomes known the user's device does not include these services.

At block 232, when the called device contains a similar client or application, the received SMS triggers the client to run on the called device and determine the services supported by the called device. Routine 200 may proceed to decision block 234 and determine if the called device is configured to perform such capabilities. Should the device not be configured, or be disabled, routine 200 proceeds to block 236 and ends, else to block 238.

At decision block 238, the running script attempts to detect if the device supports video calling. If the device does not support video calling (or, alternatively, if the called party does not want to indicate that the device supports video calling), routine proceeds to block 240 and returns a message to the user of device 100 indicating that the called device does not support video calling, and ends. The called device may also provide no indication. If the device does support video calling, routine 200 proceeds to block 242 and indicates to the user of the mobile device 100 that the called device supports video calling. For example, the system may send a machine readable SMS to device 100 providing such an indication.

After blocks 228 or 242, routine 200 proceeds to block 244 and the system receives the return SMS at device 100. Reception of the return message (or a message having a machine-readable or human-readable positive indication) may trigger a script to begin video calling, to update a database of numbers known to support video calling, and so on. At block 246, the system may update a user's contact to list with information related to video calling. Routine 200 may proceed from block 246 to block 248 and insert the number to provide a reminder to the user at a later time, may proceed to block 250 and implement a reminder or other indicators to the user's contact list, or may initiate other processes, such as video calling between the user and the called party.

Figure 3:
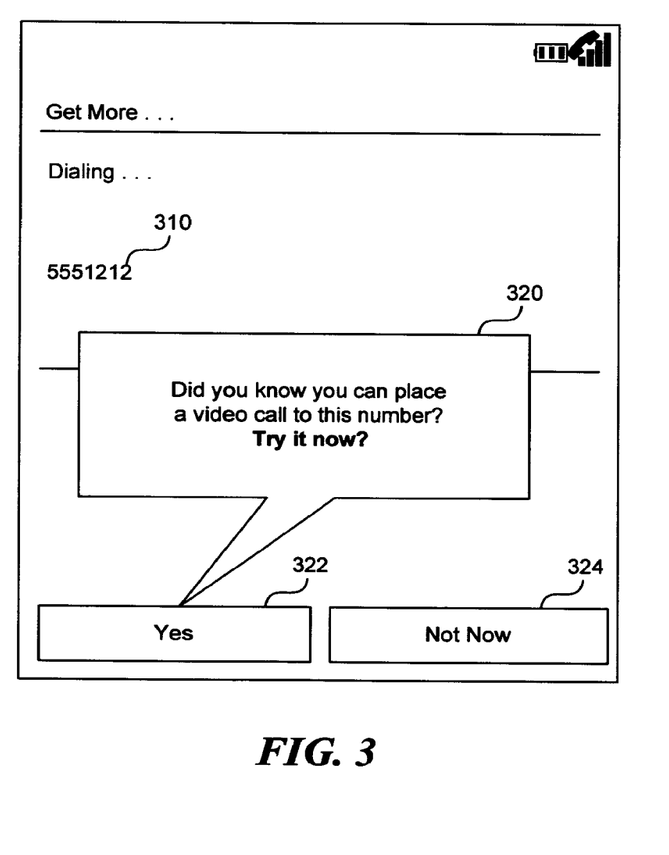
FIG. 3 is a mobile device display illustrating an example screen for presenting options during calls.

Referring to FIG. 3, a display illustrating an example screen 300 is shown. Screen 300 includes the called number 310, and a reminder balloon 320 that reminds the user that the device associated with the called number supports video calling. During the placement of the call, the system may present options to the user, such as a "Yes" option 322 to begin video calling, or a "Not Now" option 324 to proceed as a regular call. Thus, in some cases, the system presents the user calling options during the placement of a call, during a call, and so on.

Thus, the system is capable of determining from a users' device whether a called device contains a certain service or capability. For example, the system may determine the support of services such as video calling, audio or video conferencing (such as two-way conferencing), picture messaging, media playback, and so on. Upon a positive determination, the system may provide options to a user, such as options to proceed with a certain service during or instead of the call.

In some cases, the system is implemented in both the user device 100 and a called device, and uses machine-readable messages sent via the background of the devices. In these cases, the user and/or users may not be aware or alerted to the transmission of messages. In some cases, the system is only implemented on the user device 100. In these cases, the system may send a human-readable message (such as "Hi, I have video calling. Do you? Please reply to this message if you have video calling and would like to use this capability."). The system may then require the called user to send a return message in order to determine what services the called party's device supports.

While video calling is described above as an example, various other services or features may likewise benefit from the system described above. For example, the system may help users to employ voice over IP to communicate using mobile devices. Users may find other or remote players to join them in playing a multiplayer game, such as a multiplayer video game hosted by a server that coordinates play between separate user devices. Text messaging, instant messaging, cameras, music players, and sharing of images, videos, music or other content are further features that the above system helps users employ.

CONCLUSION

The teachings of the technology provided herein can be applied to other systems, not necessarily the system described above. The elements and acts of the various examples described above can be combined to provide further examples. All of the above patents and applications and other references, including any that may be listed in accompanying filing papers, are incorporated by reference. Aspects of the technology can be modified, if necessary, to employ the systems, functions, and concepts of the various references described above to provide yet further examples of the technology.

These and other changes can be made to the technology in light of the above Detailed Description. While the above description details certain examples of the technology and describes the best mode contemplated, no matter how detailed the above appears in text, the technology can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

While certain aspects of the technology are presented below in certain claim forms, the inventors contemplate the various aspects of the technology in any number of claim forms.

We claim:

1. A method of identifying a service supported by a second mobile device, the method comprising:
   at a first mobile device associated with a user, receiving an indication of a voice call placed to a called number for the second mobile device;
   transmitting via the first mobile device a first message to the second mobile device,
      wherein the first message is configured to request whether one or more first services that are supported by the first mobile device are supported by the second mobile device;
   receiving at the first mobile device a second message from the second mobile device that indicates, as one or more second services, a subset of the first services that are supported by the second mobile device;
   determining that a counter is below a threshold value;
   requesting a selection from the user of a service of the one or more second services;
   after determining that the counter is below the threshold value, receiving a selected service from the user; and
   in response to receiving the selected service from the user, initiating a communications channel using the selected service and switching communications between the first mobile device and the second mobile device to the selected service using the communications channel instead of the voice call;
   wherein the counter specifies a number of times the user has responded to the requesting of the selection in relation to the called number.

2. The method of claim 1, wherein the second message is automatically generated and transmitted from the second mobile device to the first mobile device in response to receiving the first message by the second mobile device.

3. The method of claim 1, wherein the second message includes information selected by a second user associated with the second mobile device.

4. The method of claim 1, further comprising:
   querying a database relating numbers for mobile devices with one or more third services provided by the mobile devices; and
   determining, by the first mobile device and based on results of the query, that the called number is not mapped to any services in the database;
   wherein the database is stored with the first mobile device.

5. The method of claim 1, wherein the first message includes a unique identifier associated with the first mobile device.

6. The method of claim 1, wherein a determination of the one or more first services that are supported by the first mobile device is based on a determination that a network connection sufficient to support the one or more first services is available.

7. The method of claim 1, further comprising:
   updating a database to relate the one or more second services to the called number.

8. The method of claim 1, wherein the first message and second message are text messages.

9. The method of claim 1, wherein the second mobile device is from a group of two or more devices.

10. The method of claim 1, wherein initiating the communications channel includes initiating an interactive application between the first mobile device and the second mobile device using the selected service.

11. The method of claim 1, wherein the second message includes information input by a second user associated with the second mobile device.

12. A system for enhancing a phone call between two mobile devices, the system comprising:
- an input component, wherein the input component is configured to receive input from a user associated with a first mobile device to initiate placement of a voice call to a party associated with a second mobile device;
- a call component, wherein the call component is configured to receive the input and place the voice call to the party associated with the second mobile device;
- a determination component, wherein the determination component is configured to determine one or more services supported by the second mobile device;
- a matching component configured to match the one or more services supported by the second mobile device with one or more corresponding services supported by the first mobile device to determine one or more common communication capabilities supported by both the first mobile device and the second mobile device;
- a selection frequency checker configured to make a determination that a frequency is below a threshold;
- a display component, wherein the display component is configured to, after the determination that the frequency is below the threshold, display an option to switch communications from the voice call to a communication channel that uses at least one of the one or more common communication capabilities supported by both the first mobile device and the second mobile device;
- wherein the input component is further configured to receive, from the user, a selection of a common communication capability of the at least one of the one or more common communication capabilities; and
- an implementation component, wherein the implementation component is configured to, in response to receiving the selection of the common communication capability from the user, initialize a communication channel between the first and the second mobile devices using the selected common communication capability, and switch communications to the initialized communication channel instead of the voice call;
- wherein the frequency specifies a number of times the user has responded, in relation to the second mobile device, to the option to switch communications.

13. The system of claim 12, wherein the matching component comprises a message component,
- wherein the message component is configured to transmit a message to the second mobile device to determine one or more additional services supported by the second mobile device when the matching component does not initially determine any common communication capabilities supported by both the first mobile device and the second mobile device, the message requesting information related to services supported by the second mobile device.

14. The system of claim 12, wherein the determination component queries a database relating phone numbers with services provided by devices associated with the phone numbers.

15. The system of claim 12, wherein the determination of the one or more common communication capabilities is based on a determination that a network connection sufficient to support the common communication capabilities is available.

16. A method performed by a first mobile device for determining capabilities of other mobile devices, the method comprising:
- automatically transmitting a first message to a destination mobile device associated with a user;
  - wherein the first message is configured to request information related to a service supported by the destination mobile device;
- receiving a second message from the destination mobile device comprising an indication of two or more services supported by the destination mobile device;
- determining a number of times the user has responded to an option to switch communications in relation to a called number;
- displaying a second option to switch communications from a first communication channel selected by the user to an available interactive application that uses one of the two or more services supported by the destination mobile device;
- after determining that the number of times is below a threshold, receiving user input selecting the available interactive application; and
- in response to receiving the user input selecting the available interactive application, initializing communication between the first and the destination mobile devices using the selected available interactive application and the services supported by the destination mobile device.

17. The system of claim 12, wherein the one or more services supported by the second mobile device comprise two or more services supported by the second mobile device.

18. The system of claim 12, further comprising:
- querying a database relating numbers for mobile devices with one or more third services provided by the mobile devices; and
- determining, by the first mobile device and based on results of the query, that the second mobile device is not mapped to any services in the database;
- wherein the database is local to the first mobile device.

19. The system of claim 12, wherein the selected one of the one or more common communication capability is a game application.

* * * * *